Nov. 28, 1950 W. ANGST ET AL 2,531,492
RATE OF CHANGE INDICATOR
Filed Nov. 27, 1946 2 Sheets-Sheet 2

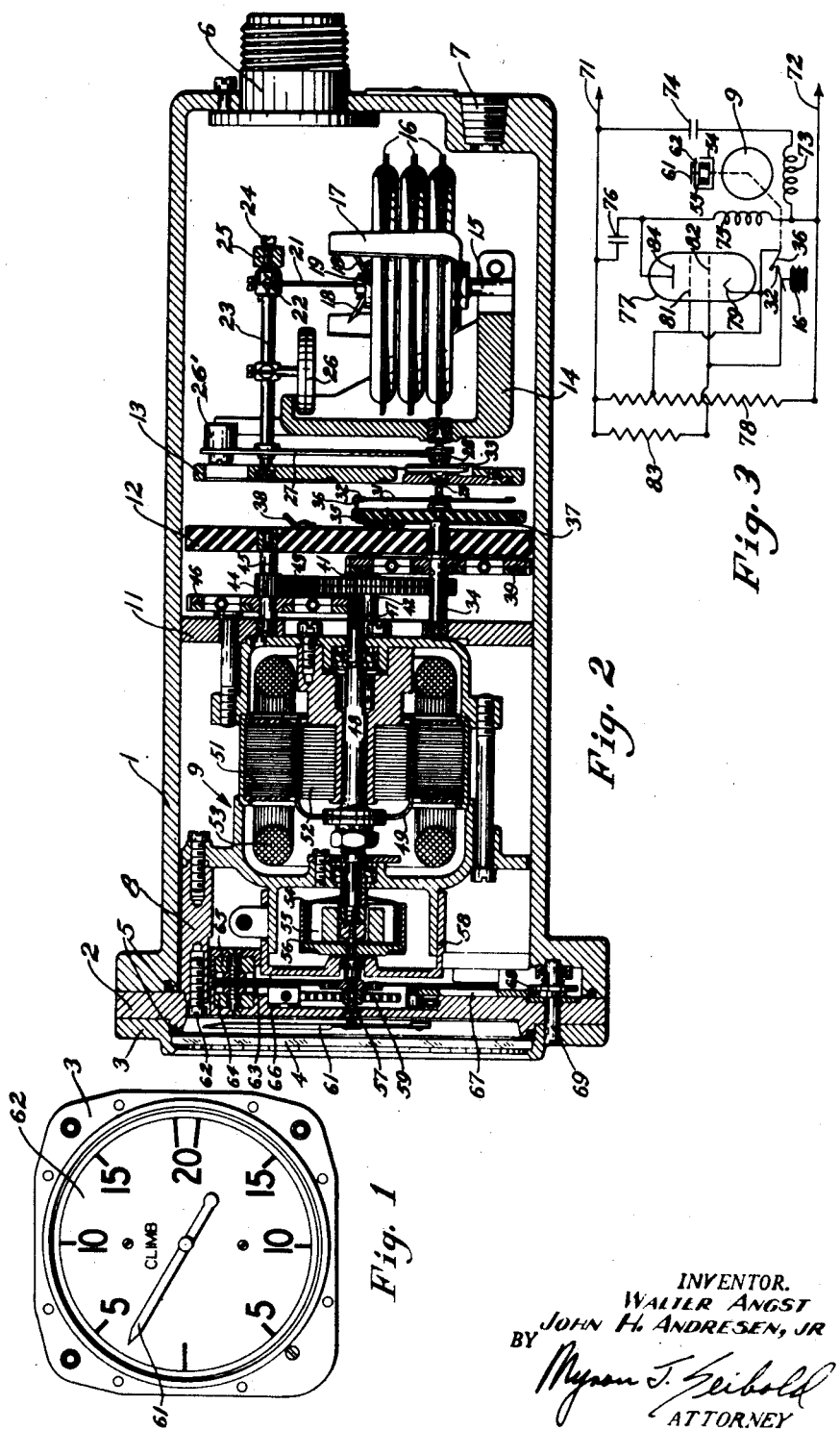

INVENTOR.
WALTER ANGST
BY JOHN H. ANDRESEN, JR

ATTORNEY

Patented Nov. 28, 1950

2,531,492

UNITED STATES PATENT OFFICE 2,531,492

RATE OF CHANGE INDICATOR

Walter Angst, Manhasset, and John H. Andresen, Jr., Port Washington, N. Y., assignors to Square D Company, Detroit, Mich., a corporation of Michigan Application November 27, 1946, Serial No. 712,548

4 Claims. (Cl. 73—179)

This invention relates to instruments for indicating the rate of change of a variable condition.

An object of the invention is to provide an instrument indicating a rate of change of a condition in which a motor is rotated at a speed determined by the rate of change of the condition and in which a tachometer or other means responsive to the motor speed indicates the rate of change of the condition.

Another object of the invention is to provide an instrument in accordance with the preceding object in which a first contact is moved by means responsive to the variable condition and in which a second contact is driven by the motor so as to follow up the movement of the first contact whereby the speed of the motor will be determined by the speed of movement of the first contact.

Another object of the invention is to provide a rate of climb indicator for aircraft in accordance with the preceding objects in which the condition responsive means is responsive to the altitude of the aircraft.

Another object of the invention is to provide an instrument in accordance with the first two objects indicating the acceleration of an aircraft in which the condition responsive means is responsive to the airspeed of the aircraft.

Other objects and features of the invention will be readily apparent to those skilled in the art from the specification and appended drawings illustrating certain preferred embodiments in which:

Figure 1 is a front elevational view of a rate of climb instrument according to the present invention.

Figure 2 is a longitudinal sectional view through the rate of climb indicator.

Figure 3 is a wiring diagram of the motor control circuit.

Figure 5:
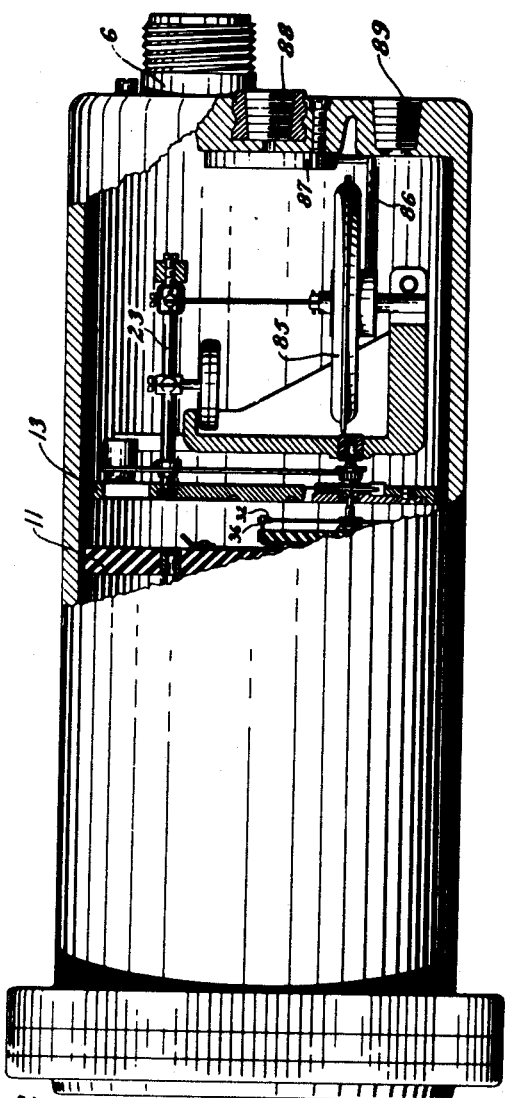
Figure 5 is a partial sectional view through the accelerometer of Figure 4.

While motor driven tachometers are not new per se, having been used for speed indication such as in the patent to Paul Kollsman, No. 2,232,789, granted February 25, 1941, for Tachometer, it is believed to be entirely novel with applicants to provide an instrument in which a motor driven tachometer indicates the rate of change of a variable condition. To regulate the motor speed in accordance with this rate of change of the condition as distinguished from the value thereof, applicants provide structure wherein a first contact is moved by mechanism whose movement responds to change in the condition and follows this first contact with a second contact driven by the motor at a speed which is determined by the speed of movement of the first contact. Hence, the speed of rotation of the motor is determined by the rate of change of the condition and not by the instantaneous value thereof. The instrument is broadly applicable to the measurement of any rate of change and is herein specifically disclosed as applied to a rate of climb indicator and accelerometer for aircraft.

In the rate of climb indicator shown in Figures 1, 2 and 3, there is provided an airtight casing 1 closed at its front by a stationary supporting disk 2 and a bezel 3 in which is disposed a transparent window 4, the parts being sealed by the rubber gaskets 5. At the rear of the casing 1 there is shown a socket 6 for electrical connections and an opening 7 for connection to the static line of a Pitot static tube. To the disk 2 by means of posts 8 is rigidly mounted the frame of a motor 9 upon which is in turn mounted a stationary supporting plate 11 which in turn carries the stationary supporting plates 12 and 13 by suitable spacer posts, not shown. A supporting frame 14 is rigidly secured to the plate 13 and has clamped therein a supporting post 15 for a plurality of serially connected aneroid capsules 16. The aneroid capsules are temperature compensated in known manner by a bi-metallic strap 17 and pins 18 extending between the ends thereof and a hub 19 at the top of the group of aneroids 16.

A lever arm 21 is pivotally connected to the hub 19 and to a rock arm 22 on a rockshaft 23 pivoted in the plate 13 and on a pivot screw 24 in a stationary support 25. The rockshaft 23 is provided with a suitable counterbalance 26. Upon the rockshaft 23 is secured a sector 27 counterbalanced at 26' and having teeth thereon meshing with a pinion 28 pivoted in the supporting frame 14 and supporting plate 13 upon a shaft 29 carrying a contact arm 31 terminating in the contact 32. A biasing spring for the shaft 29 is provided at 33 to absorb backlash in the system so far described.

Within supporting plates 11 and 12 is pivoted a shaft 34 carrying at one end an insulating disk 35 from which extends a contact 36 cooperating with a contact 32. The contact 36 is connected to a collector ring 37 from which stationary brushes lead to a terminal 38 on the insulating supporting plate 12. Upon shaft 34 is rigidly mounted a gear wheel 39 meshing with a pinion 41 on a shaft 42 pivoted in the supporting plates 11 and 12. Upon the shaft 42 is rigidly mounted a gear wheel 43 meshing with the pinion 44 on a shaft 45 pivoted in the supporting plates 11 and 12. Upon the shaft 45 is rigidly mounted a gear wheel 46 cooperating with a pinion 47 at one end of the shaft 48 of the motor 9.

The motor 9 is a two phase drag cup motor having a conducting drag cup 49 mounted on the shaft 48 and rotatable therewith between the stationary magnetic circuits provided by the outer magnet structure 51 and inner magnet structure 52. The motor winding is indicated at 53. The shaft 48 is appropriately pivoted in bearings in the opposite ends of the motor frame.

Upon the forward end of the shaft 48 is mounted a conducting drag cup 54 of a magnetic tachometer employing a multipole permanent magnet 55 and an outer cylinder 56 of magnetic material between which the drag cup 54 rotates. While referred to as a drag cup, the elements of the magnetic tachometer have herein been reversed inasmuch as the drag cup motor 54 is driven at the same speed as the motor 9 to apply a torque to the permanent magnet 55 directly proportional to the speed of motor rotation.

The permanent magnet 55 and magnetic outer cylinder 56 are mounted on a shaft 57 pivoted in the supporting disk 2 and in a cup-shaped frame 58 disposed on an extension of the frame of the motor 9. The shaft 57 is biased against rotation by a coil spring 59 and at its forward end carries a pointer 61 cooperating with a dial 62 mounted on the disk 2 and bearing indicia of rate of climb. Upon the shaft 57 is mounted a conducting damping disk 63 adapted to rotate between a plurality of circumferentially disposed sets of permanent magnets 64 and 65 to dampen the pointer movement.

One end of the coil spring 59 is attached to the shaft 57 and its opposite end is attached to a rotatable ring 66 mounted in the supporting disk 2. Connected to the ring 66 is a lever arm 67 having an opening at its lower portion at which is disposed a cam 68 eccentrically mounted on an adjusting shaft 69 to provide for adjustment of the zero reading of the instrument.

Connections to the contacts 36 and 32 are made at the terminal 38 and at any point on the supporting plate 13 since through the spring 33 the supporting plate 13 is in good conduction relation with the contact 32. The electrical circuit is shown in the wiring diagram of Figure 3 and substantially corresponds to that disclosed in the co-pending application of John H. Andresen, Jr., Serial No. 644,136, filed January 29, 1946, now Patent No. 2,437,064, for Motor Control. In this circuit the alternating current source is supplied to the lines 71 and 72. The phase 73 of the motor 9 is fed directly through a condenser 74. The winding 75 of the motor 9 is fed through a condenser 76 and through a tube 77 by-passing the condenser 76. A voltage dividing resistor is indicated at 78 and at a point thereon adjacent the line 71 is connected to the cathode 79 and the suppressor grid 81 of the tube 77. The control grid 82 is connected through a grid protective resistor 83 to the line 71 and is also connected to the contact 32. The contact 36 is connected to the cathode 79. The anode 84 is connected to the phase winding 75 of the motor 9.

The capacity of condenser 74 is greater than the capacity of condenser 76 so that when the tube 77 is not firing, i. e. when the contacts 32 and 36 are not engaged, the current in the phase winding 75 will lead that in phase winding 73 to rotate the motor 9 in one direction. When the contacts 32 and 36 are engaged, the tube 77 fires to feed winding 75 through a substantially resistive circuit so that the current therethrough now follows in time-phase the current in phase winding 73 so that the motor 9 rotates in the opposite direction. Accordingly, the motor 9 rotates in opposite directions depending upon whether the contacts 32 and 36 are engaged or disengaged and the contact 36 follows the movement of the contact 32 and at the same speed. Therefore, the average speed of rotation of the motor 9 is directly proportional to the speed of movement of the contact 32 and hence the indication of the drag cup tachometer will be proportional to the speed of movement of the contact 32. The movement of the contact 32 is dependent upon the change in the altitude of the instrument and the aircraft in which it is mentioned and not upon the instantaneous value of the altitude. Accordingly, the tachometer reading represented by the position of the pointer 61 directly indicates the rate of change of altitude of the aircraft and hence its rate of climb or descent. The dial 62 is provided with suitably calibrated indicia of rate of climb and the position of the pointer relative to the indicia is indicative of this rate.

Figure 4:
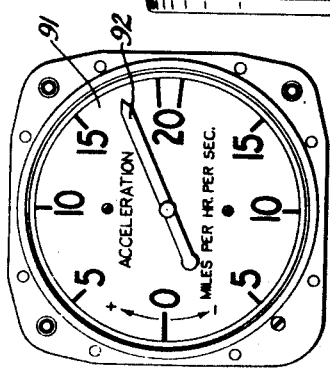
Figure 4 is a front elevational view of the accelerometer according to the present invention.

The structure of the accelerometer of Figures 4 and 5 is substantially the same as that for the rate of climb indicator of Figures 1 and 2 and the same motor control circuit is used. However, for the aneroid capsules 16 there is substituted a diaphragm capsule 85, the interior of which is connected by tubing 86 and mounting disk 87 to an opening 88 adapted to be connected to the Pitot line of a Pitot static tube. A second opening 89 in the instrument case is adapted to be connected to the static line of the Pitot static tube. The dial 91 of the accelerometer is calibrated in units of acceleration and the pointer 92 cooperates therewith to indicate this acceleration as a rate of change of the airspeed of the aircraft. The operation of the accelerometer is the same as the operation of the rate of climb instruments previously described except that the condition to which the instrument is responsive is airspeed which in the form of Pitot pressure causes movement of the diaphragm capsule 85 to effect movement of the contact 32 at a speed determined by the rate of change of the Pitot pressure and airspeed and not by their instantaneous values.

Applicants' invention broadly provides a novel means for indicating the rate of change of a variable condition and in its specific form shows rate of climb and accelerometers for aircraft which are far more reliable and have greatly decreased lag over instruments previously used for this purpose.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. A rate of pressure change responsive instrument comprising, in combination, a pressure sensitive element movable in response to changes in pressure acting thereon; a reversible motor; control means actuated by said element for controlling said motor, said control means including a first member movable by said pressure sensitive element and a second member driven by said motor in a direction to follow the first member to cause the motor to move in proportion to the movement of the pressure sensitive element; and means responsive to the rate of movement of the motor including an element displaceable in proportion to the rate of movement, said rate responsive means including provision for averaging the response to the rate of movement of the motor.

2. A rate of pressure change indicator comprising, in combination, a pressure sensitive diaphragm movable in response to changes in pressure acting thereon; a reversible motor; control means actuated by said diaphragm for controlling said motor, said control means including a first member movable by said diaphragm and a second member driven by said motor in a direction to follow the first member to cause the motor to turn in proportion to the movement of the diaphragm whereby the motor movement becomes an amplified repetition of the diaphragm movement; a drag cup tachometer actuated by said motor, said tachometer having an element displaceable in proportion to the rate of movement of the motor and including provision for averaging the rate of movement response; and an indicator operable by said tachometer element for indicating the rate of pressure change acting on said diaphragm.

3. A rate of climb indicator comprising, in combination, an aneroid capsule responsive to altitude pressure; a reversible motor; control means actuated by said capsule for controlling said motor, said control means including a first member movable by said capsule and a second member driven by said motor in a direction to follow said first member to cause the motor to turn in proportion to the movement of the capsule, whereby the motor movement becomes a repetition of the capsule movement amplified with respect to torque and displacement; a magnetic drag cup tachometer actuated by said motor, said tachometer having an element displaceable in proportion to the rate of movement of the motor and including provision for averaging the rate of movement response; and an indicator operable by said tachometer element for indicating rate of climb.

4. An accelerometer for aircraft comprising, in combination, a pressure sensitive diaphragm responsive to changes in the dynamic pressure of the craft; a reversible motor; control means actuated by said diaphragm for controlling said motor, said control means including a first member movable by said diaphragm and a second member driven by said motor in a direction to follow the first member to cause the motor to turn in proportion to the movement of the diaphragm, whereby the motor movement becomes a repetition of the diaphragm movement amplified with respect to torque and displacement; a magnetic drag cup tachometer actuated by said motor, said tachometer having an element displaceable in proportion to the rate of movement of the motor and including provision for averaging the rate of movement response; and an indicator operable by said tachometer element for indicating acceleration and deceleration of the craft.

WALTER ANGST.
JOHN H. ANDRESEN, Jr.

REFERENCES CITED

The following references are of record in the file of this patent:

UNITED STATES PATENTS

| Number | Name | Date |
| --- | --- | --- |
| 1,160,679 | Wilkinson | Nov. 16, 1915 |
| 1,664,265 | Rieber | Mar. 27, 1928 |
| 2,078,982 | Stark | May 4, 1937 |
| 2,266,449 | Ullrich | Dec. 16, 1941 |
| 2,305,789 | Kempe | Dec. 22, 1942 |
| 2,340,403 | Morley et al. | Feb. 1, 1944 |
| 2,355,567 | Sparrow | Aug. 8, 1944 |
| 2,437,064 | Andresen | Mar. 2, 1948 |

Certificate of Correction

Patent No. 2,531,492   November 28, 1950

WALTER ANGST ET AL.

It is hereby certified that error appears in the printed specification of the above numbered patent requiring correction as follows:

Column 4, line 21, for the word "mentioned" read *mounted*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*